United States Patent
Niiya

(10) Patent No.: US 8,127,027 B2
(45) Date of Patent: Feb. 28, 2012

(54) TELEPHONE SYSTEM, SERVER, AND TERMINAL DEVICE

(75) Inventor: Norimasa Niiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 12/642,245

(22) Filed: Dec. 18, 2009

(65) Prior Publication Data

US 2010/0241754 A1    Sep. 23, 2010

(30) Foreign Application Priority Data

Mar. 18, 2009    (JP) .................................. 2009-067012

(51) Int. Cl.
   G06F 15/16    (2006.01)
   G06F 15/173   (2006.01)

(52) U.S. Cl. ........ 709/228; 709/203; 709/224; 709/227; 709/229

(58) Field of Classification Search .................. 709/203, 709/224, 226, 227, 228, 229; 370/352, 359
See application file for complete search history.

(56) References Cited

U.S. PATENT DOCUMENTS 6,108,350 A  *  8/2000  Araujo et al. ................ 370/467
(Continued)

FOREIGN PATENT DOCUMENTS

JP    2001-298479    10/2001
(Continued)

*Primary Examiner* — Quang N. Nguyen
(74) *Attorney, Agent, or Firm* — Blakely, Sokoloff, Taylor & Zafman LLP

(57) ABSTRACT

According to one embodiment, there is provided a telephone system comprises terminal devices which process a signaling protocol, and a server which forms a session with each terminal device using a first protocol or a second protocol as a lower layer protocol of the signaling protocol. The terminal device comprises request module requests the server to form a session using the first protocol. The server comprises determination module, session forming module and switching module. The determination module determines permission or rejection to the request. The session forming module forms a session with a request source terminal device using the first protocol when the request is permitted, or using the second protocol when the request is rejected. The switching module switches the lower layer protocol of the session from the second protocol to the first protocol when the request from the terminal device is permitted.

9 Claims, 7 Drawing Sheets

U.S. PATENT DOCUMENTS

| | | | |
|---|---|---|---|
| 6,987,985 B2 * | 1/2006 | Purkayastha et al. | 455/552.1 |
| 6,990,107 B1 * | 1/2006 | Rinne et al. | 370/395.6 |
| 7,441,265 B2 * | 10/2008 | Staamann et al. | 726/4 |
| 7,596,092 B2 * | 9/2009 | Harrington et al. | 370/241 |
| 2003/0145094 A1 * | 7/2003 | Staamann et al. | 709/229 |
| 2005/0262251 A1 | 11/2005 | Klemets et al. | |
| 2007/0249390 A1 * | 10/2007 | Purkayastha et al. | 455/552.1 |
| 2009/0213826 A1 * | 8/2009 | Wang et al. | 370/338 |

FOREIGN PATENT DOCUMENTS

| | | |
|---|---|---|
| JP | 2002-281103 | 9/2002 |
| JP | 2004-032039 | 1/2004 |
| JP | 2004-153777 | 5/2004 |
| JP | 2005-348262 | 12/2005 |
| JP | 2007-536796 | 12/2007 |

* cited by examiner

| Extension number | Priority | User | IP address |
|---|---|---|---|
| 3000 | High | CCC | 192.168.0.a |
| 3001 | Low | AAA | 192.168.0.b |
| 3002 | High | YYY | 192.168.0.c |
| 3003 | High | UUU | 192.168.0.d |
| 3004 | Low | ZZZ | 192.168.0.e |
| ⋮ | ⋮ | ⋮ | ⋮ |

Management table 14a

F I G. 3

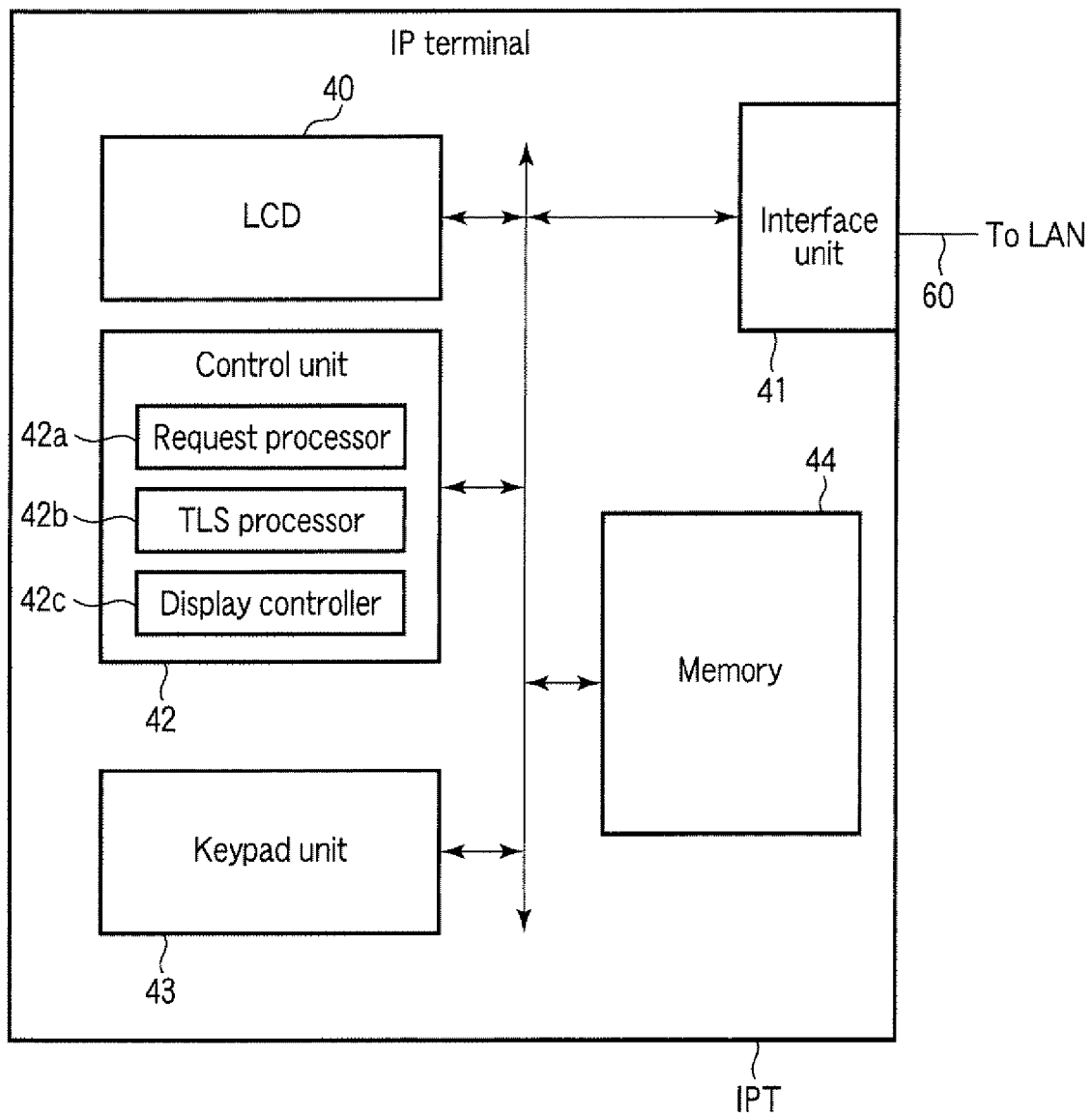
F I G. 4

Empty TCP connection resource assured

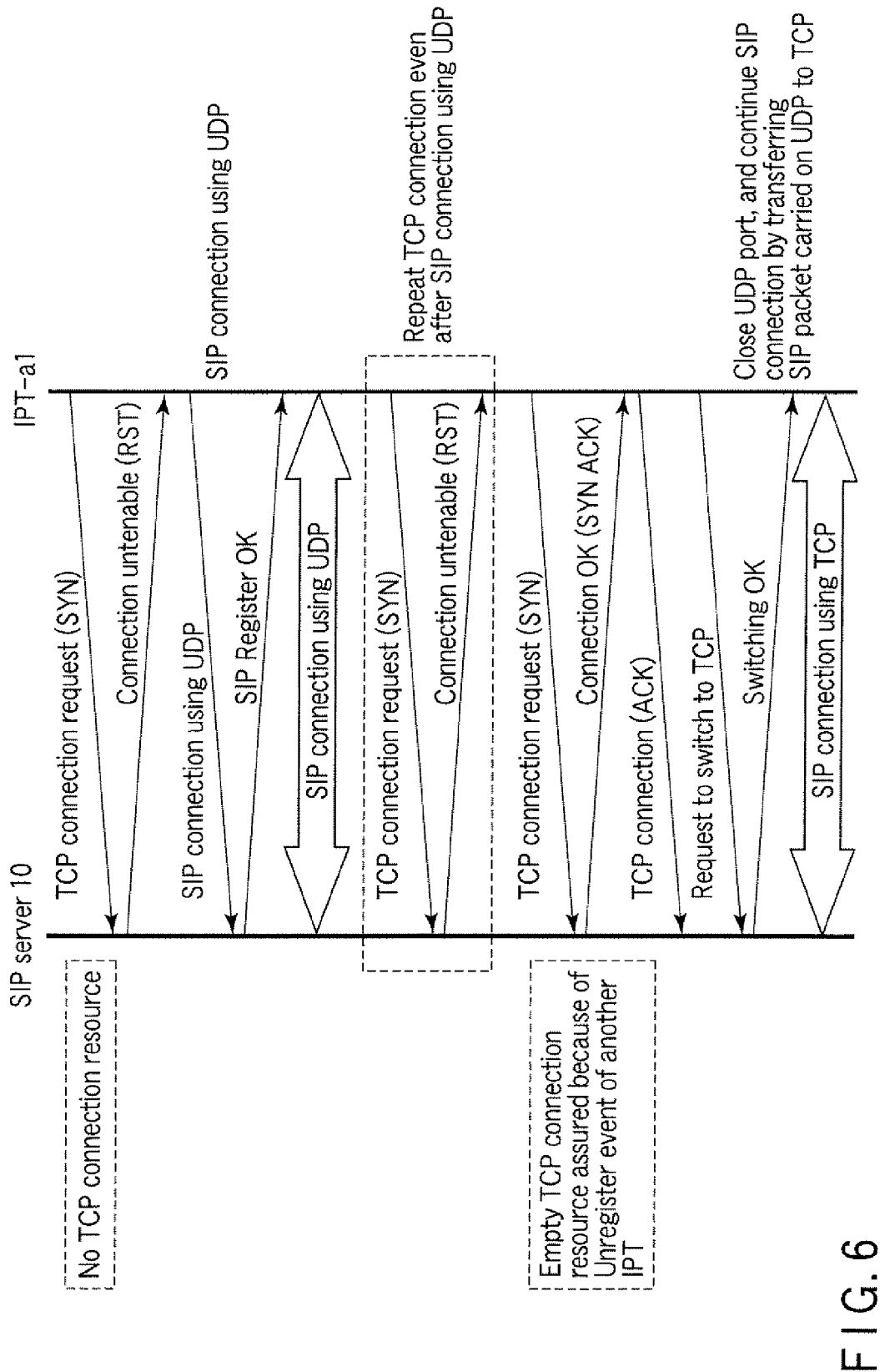
F I G. 6

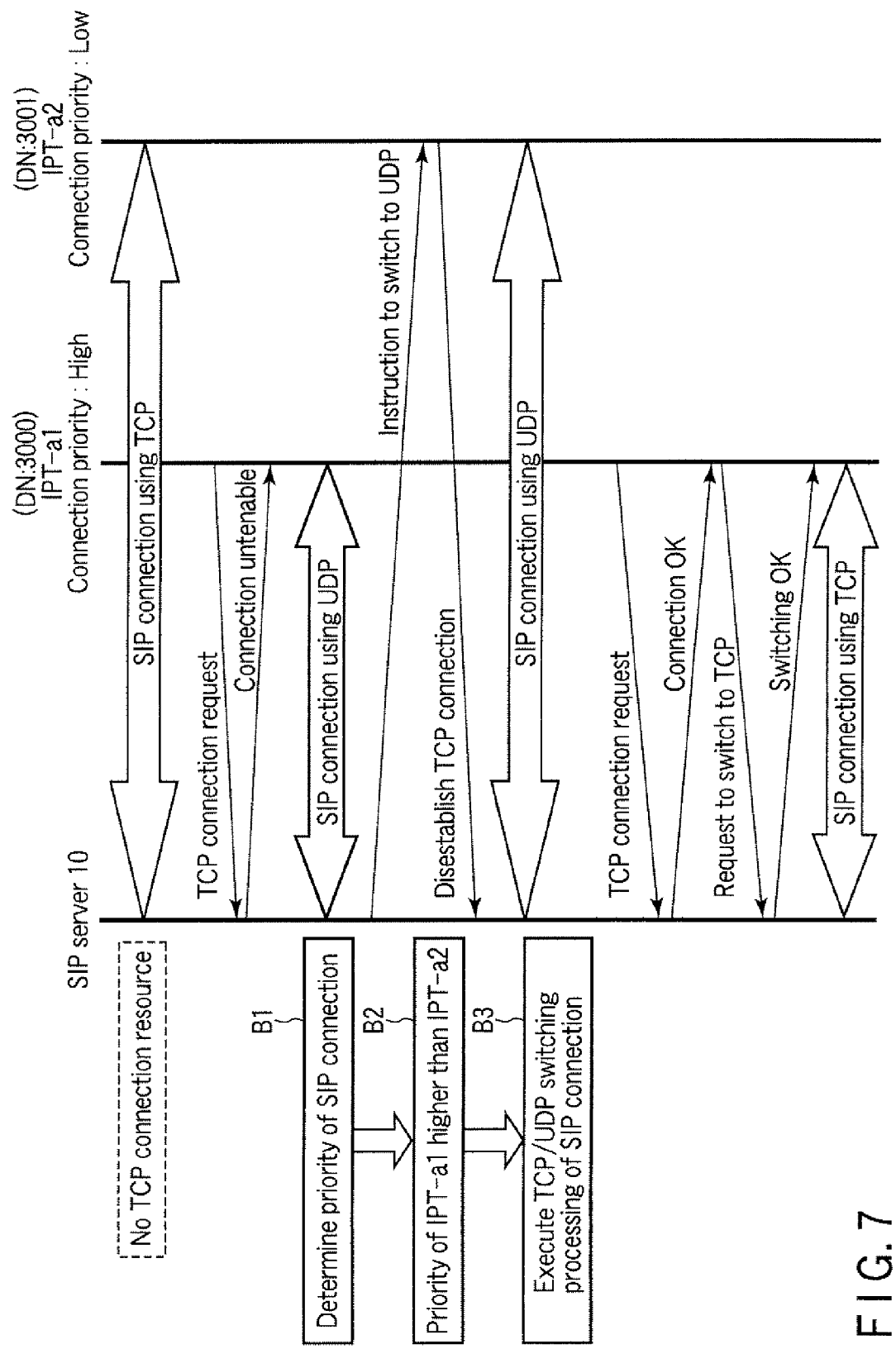
F I G. 7

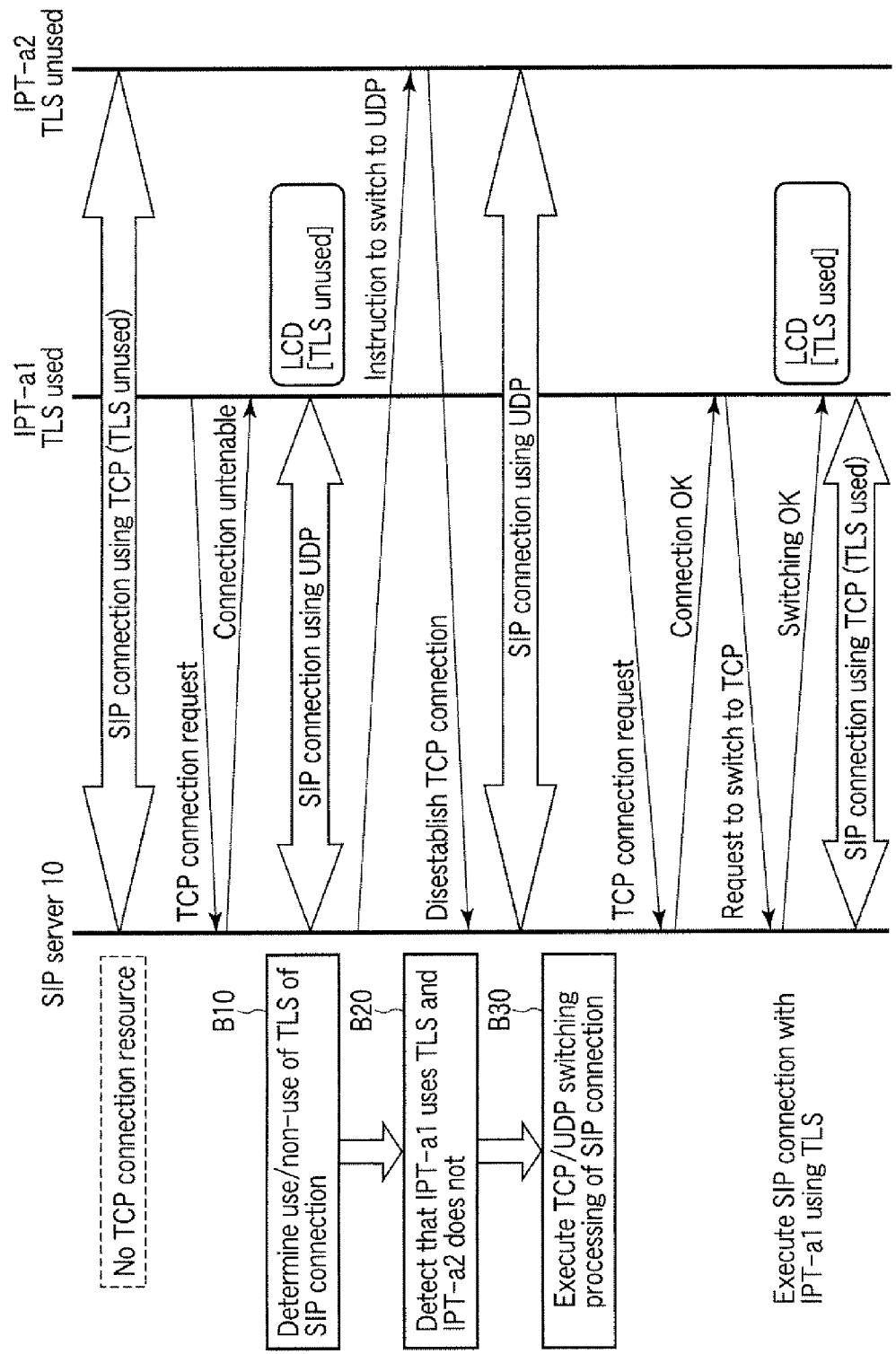
F I G. 8

TELEPHONE SYSTEM, SERVER, AND TERMINAL DEVICE

CROSS-REFERENCE TO RELATED APPLICATIONS

This application is based upon and claims the benefit of priority from Japanese Patent Application No. 2009-067012, filed Mar. 18, 2009, the entire contents of which are incorporated herein by reference.

BACKGROUND

1. Field

The invention relates to a telephone system which allows voice communication using an Internet Protocol (IP) network and, for example, a signaling protocol such as Session Initiation Protocol (SIP) or Media Gateway Control (Megaco). More particularly, the invention relates to improvement of a system which forms a session between a terminal and server using Transmission Control Protocol (TCP) or User Datagram Protocol (UDP).

2. Description of the Related Art

In recent years, telephone systems which transmit voice packets via an IP network have attracted attention. A technical background will be explained below taking a typical SIP telephone system as an example. A SIP telephone system includes a server (SIP server) used to manage the addresses, extension numbers, and the like of telephone terminals (to be referred to as IP terminals hereinafter). Each IP terminal forms a session with the SIP server using UDP or TCP, but the protocol to be used is fixedly decided at the time of registration of that terminal in the server. That is, re-registration procedures of a terminal are required to switch the connection using UDP to that using TCP or vice versa, and the connection is disconnected upon deregistration.

TCP imposes a heavier load on the system than UDP. Hence, the number of sessions using TCP connections is limited, and a session over the limit is formed using a UDP connection. However, there are services unique to TCP, and an encrypted protocol such as Transport Layer Security (TLS) is not available for UDP. Hence, in order to conduct encrypted communication from a UDP-connected terminal, procedures in which that terminal waits for an empty TCP session after the connection is canceled, and requests re-connection are required. If the user is busy, disconnection results. Hence, some measures are demanded.

Jpn. Pat. Appln. KOKAI Publication No. 2001-298479 discloses the following technique. That is, in an Internet telephone system, if the network is not busy, UDP is used. However, if the network becomes busy, TCP is used to prevent interrupted speech. This is a technique that uses TCP or UDP in voice packet transmission, and cannot be applied intact to registration of a terminal in a server.

Jpn. Pat. Appln. KOKAI Publication No. 2004-32039 discloses a network facsimile apparatus, which detects a packet delay, and conducts UDP communication if the delay is large or TCP communication if the delay is small. However, this technique cannot be applied to registration of a terminal in a server.

Jpn. Pat. Appln. KOKAI Publication No. 2002-281103 discloses a technique which switches TCP and UDP according to the occupation state of a reception buffer on the client side in a method of transferring media data from a server. However, this technique cannot be applied to registration of a terminal in a server.

As described above, in the existing telephone systems, the protocol used to form a session is fixedly decided upon registering an IP terminal in a server. Hence, in order to switch the protocol, re-registration is required after deregistration, and a trouble such as disconnection of voice communication may be posed. In addition, a problem that impairs easy encrypted communication is posed, and some measures are demanded.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is a view showing an example of a management table 14a shown in FIG. 2;

FIG. 4 is a functional block diagram showing an embodiment of IP terminals (IPTs) a1 to an and b1 to bm shown in FIG. 1;

FIG. 6 is a sequence chart showing the first embodiment of the lower layer protocol switching procedures;

FIG. 7 is a sequence chart showing the second embodiment of the lower layer protocol switching procedures; and FIG. 8 is a sequence chart showing the third embodiment of the lower layer protocol switching procedures.

DETAILED DESCRIPTION

Various embodiments according to the invention will be described hereinafter with reference to the accompanying drawings. In general, according to one embodiment of the invention, there is provided a telephone system which comprises a plurality of terminal devices configured to process a signaling protocol, and a server which forms a session with each terminal device using a first transfer protocol or a second transfer protocol as a lower layer protocol of the signaling protocol, wherein the terminal device comprises: request module configured to request the server to form a session using the first transfer protocol, and the server comprises: determination module configured to determine permission or rejection to the request; session forming module configured to form a session with the terminal device as a request source using the first transfer protocol when the determination module grants permission to the request, or using the second transfer protocol when the determination module rejects the request; and switching module configured to switch, when the determination module grants permission to a request from the terminal device which already forms the session using the second transfer protocol, the lower layer protocol of the session already formed with that terminal device from the second transfer protocol to the first transfer protocol.

By taking such means, even when a session is formed using UDP once, a TCP connection request is output from an IP terminal to a SIP server as a background process. For example, as soon as an empty TCP connection resource is assured, the request is permitted, and the UDP-connected IP terminal is re-connected using TCP. Since both TCP and UDP serve as lower layer protocols of SIP, they can be switched to each other while maintaining a SIP session. Therefore, the lower layer protocols (TCP/UDP) between the IP terminal and SIP server can be switched without executing any re-registration procedures.

Figure 1:
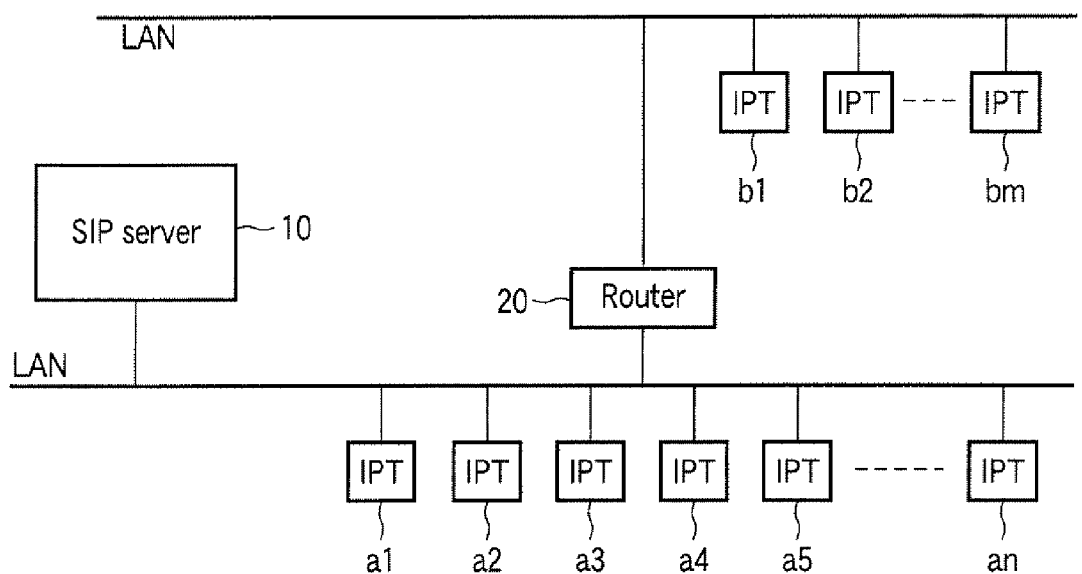
FIG. 1 is a system block diagram showing an embodiment of a telephone system according to the invention.

FIG. 1 is a system diagram showing an embodiment of a telephone system according to the invention. This system includes a plurality of IP terminals (IPTs) a1 to an which are connected to a LAN (Local Area Network), and a SIP server 10 which individually forms sessions with these IP terminals a1 to an. Each IP terminal has a function of processing the SIP as a signaling protocol, and executes a call connection control sequence by exchanging SIP messages with the SIP server 10. After a communication link is established by this sequence, the IP terminal achieves voice communication by interchanging voice packets via the LAN.

The SIP server 10 forms a session on the LAN using TCP or UDP in response to a request from the IP terminal. That is, the SIP server 10 supports SIP connections using UDP in addition to those using TCP. Both TCP and UDP serve as lower layer protocols of SIP. The SIP server 10 also executes call control, data settings, and maintenance management control such as failure detection with respect to the IP terminals a1 to an. Furthermore, IP terminals b1 to bm are connected to the LAN via a router 20. The SIP server 10 integratively controls the IP terminals a1 to an and b1 to bm.

Figure 2:
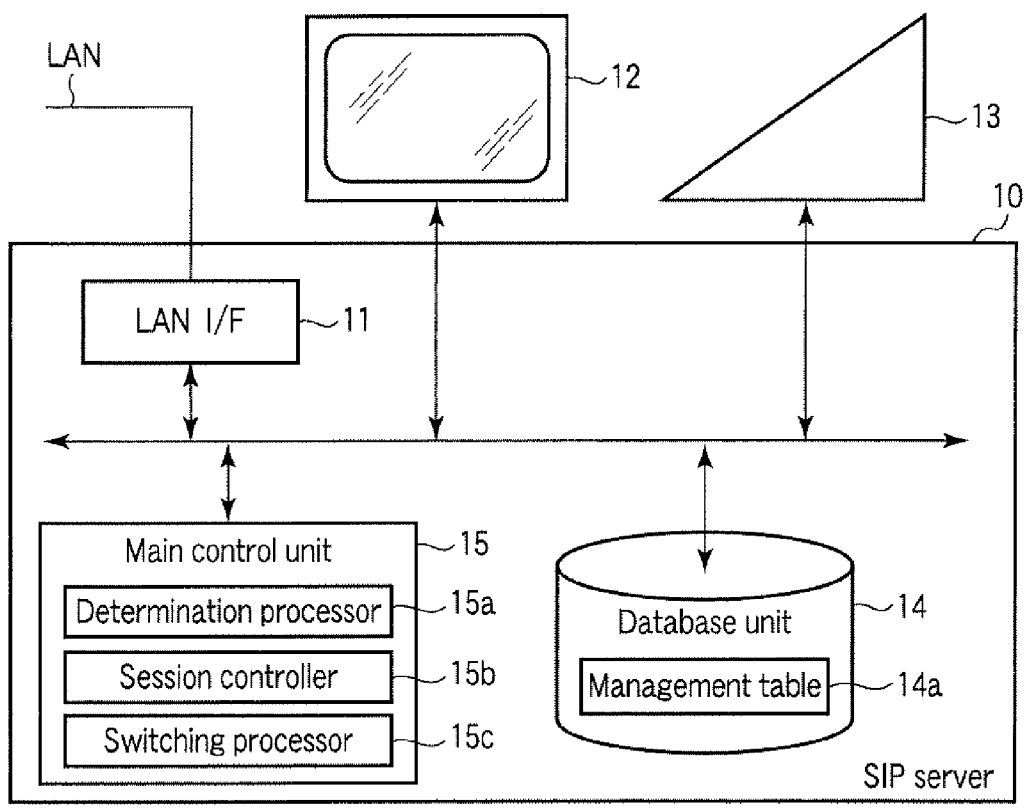
FIG. 2 is a functional block diagram showing an embodiment of a SIP server 10 shown in FIG. 1.

FIG. 2 is a functional block diagram showing an embodiment of the SIP server 10 shown in FIG. 1. The SIP server 10 includes an interface unit 11, display unit 12, input/output unit 13, database unit 14, and main control unit 15. The interface unit 11 is connected to the LAN and executes processes associated with exchanges of packets. The display unit 12 provides a user interface together with the input/output unit 13 to build up a GUI (Graphical User Interface) environment. The database unit 14 is a storage device such as a hard disc drive, and stores a management table 14a.

FIG. 3 is a view showing an example of the management table 14a. The management table 14a is used to assign a session formation priority using a TCP connection to each IP terminal. That is, the management table 14a associates a session formation priority using a TCP connection with either "high" or "low" for each extension number used to identify an IP terminal. Note that this management table 14a may also manage, for example, the user names, the IP addresses of the IP terminals, and the like, which are associated with respective extension numbers, together.

Referring back to FIG. 2, the main control unit 15 includes, as its processing functions, a determination processor 15a, session controller 15b, and switching processor 15c. The determination processor 15a determines either permission or rejection of a TCP session formation request received from the IP terminal. The criterion for determination is the remaining resources of the SIP server 10. That is, since TCP requires processing resources more than UDP, the number of TCP connection sessions is limited. For example, assuming that the upper limit number of sessions, which can be formed at the same time, is 100, if a new request is received while 100 sessions are already formed, the determination processor 15a determines to reject that request.

The session controller 15b forms a session with an IP terminal as a request source under the TCP connection when the determination processor 15a grants permission to the request. Conversely, when the determination processor 15a rejects the request, the session controller 15b forms a session with an IP terminal as a request source under the UDP connection.

When the determination processor 15a grants permission to a request continuously output from an IP terminal, which already forms a session based on the UDP connection, for a reason that an usable resource is assured, the switching processor 15c switches the lower layer protocol for session formation from COP to TCP. SIP as a host layer protocol has no concern with this switching.

FIG. 4 is a functional block diagram showing an embodiment of the IP terminals (IPTs) a1 to an and b1 to bm shown in FIG. 1. The IP terminal includes an interface (I/F) unit 41 which is connected to the LAN via a LAN cable 60, display 40, control unit 42, keypad unit 43, and memory 44. Of these units, the display 40 includes an LCD (Liquid Crystal Display), and visually displays various messages. The keypad unit 43 includes software keys, numeric keys, and the like, and accepts user's input operations. The memory 44 is a rewritable semiconductor memory device such as a flash memory.

The control unit 42 includes, as processing functions according to the invention, a request processor 42a, TLS processor 42b, and display controller 42c. The request processor 42a issues a TCP session formation request to the SIP server 10. This request is additionally written as text in a prescribed field of a Register message, which is transmitted to the SIP server 10 at a startup timing or user login operation timing, or an INVITE message, which is transmitted to the SIP server 10 at a call request timing.

Especially, in this embodiment, the request processor 42a continuously outputs a TCP session formation request to the SIP server 10 even in a state in which a session with the SIP server 10 is formed using UDP, i.e., a case in which the request is rejected.

When a session with the SIP server 10 is successfully formed using TCP, the TLS processor 42b executes control to conduct secure communication (encrypted communication) using TLS via this session. When encrypted communication using TLS is allowed, the display controller 42c displays a message that advises accordingly on the display 40 to inform the user of it.

Figure 5A:
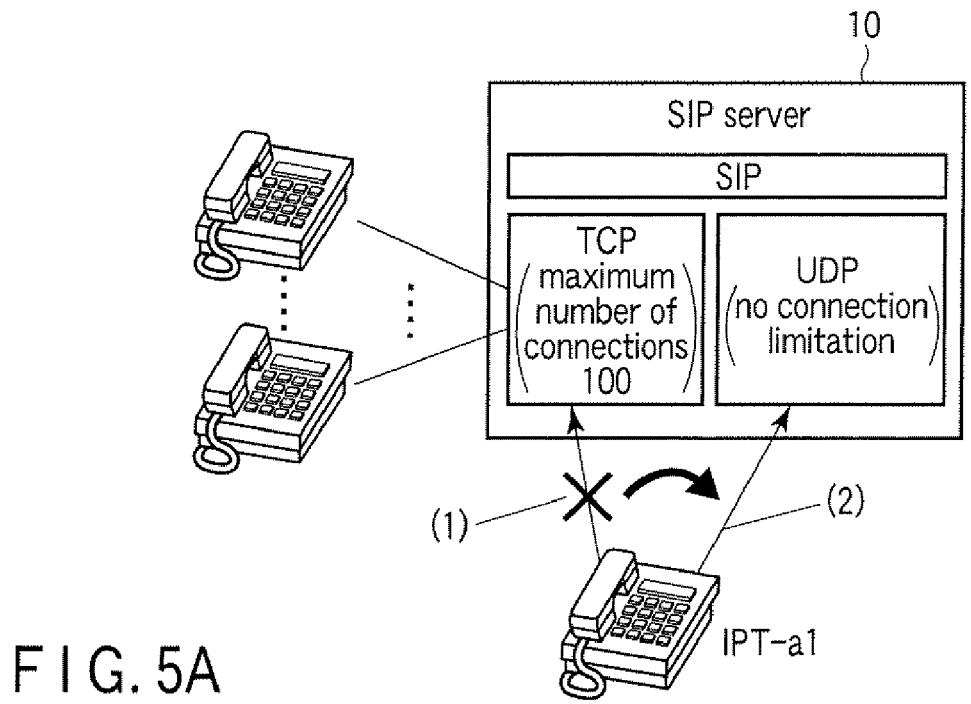
FIGS. 5A and 5B are views illustrating an example of lower layer protocol switching procedures according to this embodiment.
Figure 5B:
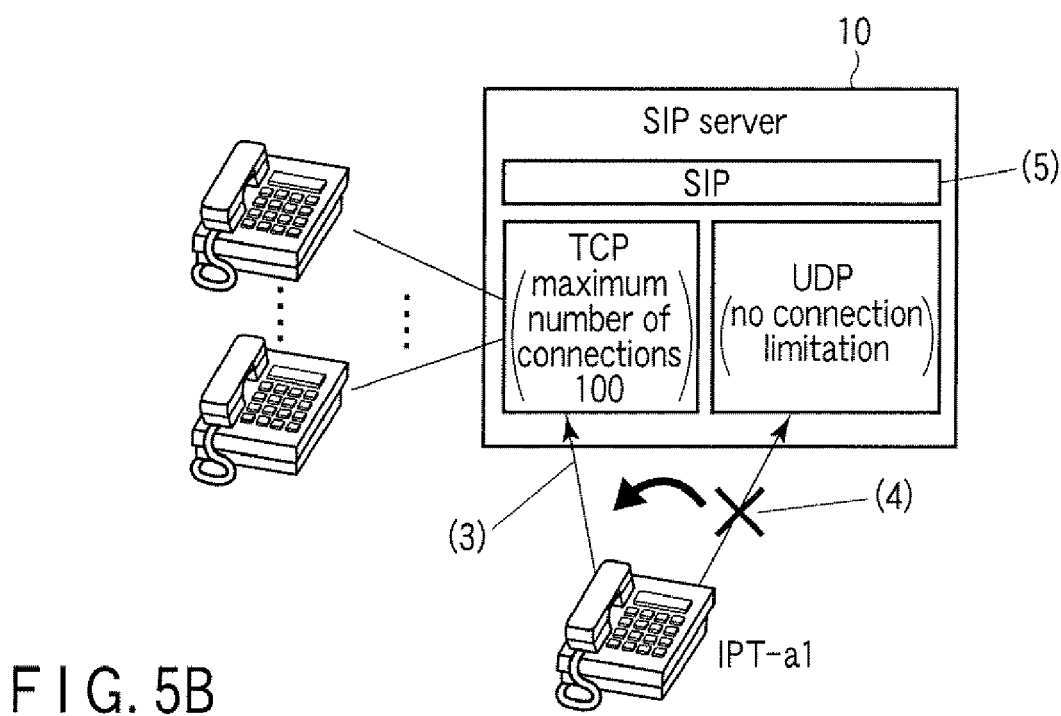

FIGS. 5A and 5B are views illustrating an example of the lower layer protocol switching procedures according to this embodiment. In this embodiment, assume that the maximum number of TCP connection sessions using is 100. That is, assume that the maximum number of IP terminals which can be connected to the SIP server 10 using TCP is 100, so as to mainly reduce the processing load. Step 1 in FIG. 52A indicates that an IPT-a1 issues a TCP connection request after a state in which TCP sessions corresponding to the maximum number are formed. Since the IPT-a1 which made a new TCP connection attempt cannot be TCP connected, it establishes a connection to the SIP server 10 using UDP in step 2. The UDP does not have any upper limit number of connections. Even after the UDP connection, the IPT-a1 continuously outputs a TCP connection request to the SIP server 10.

Assume that an arbitrary IP terminal logs out from this state, and an empty TCP connection resource is assured. FIG. 55 shows this state. Then, the SIP server 10 grants permission to the TCP connection request from the IPT-a1. In response to this, the IPT-a1 establishes a TCP connection with the SIP server 10 in step 3, and then transmits SIP packets using TCP. That is, the IPT-a1 notifies the SIP server 10 of switching to TCP, and closes a UDP port in step 4. After that, the SIP server 10 switches to continuously receive packets received using UDP from TCP. Since SIP is an application layer protocol, it has no concern with switching of TCP and UDP as the lower layers. The operations in the above arrangement will be described below while classifying them into the first to third embodiments.

First Embodiment

FIG. 6 is a sequence chart showing the first embodiment of the lower layer protocol switching procedures. In FIG. 6, an IPT-a1 outputs a TCP connection request to the SIP server 10 using a TCP SYN packet. When no TCP connection resources are available, the SIP server 10 returns an NG response using an RST packet. Upon reception of this packet, the IPT-a1 issues a SIP connection request using the UDP to the SIP server 10, and receives a reply of a SIP Register OK message. Then, a SIP connection session is formed using the UDP, thus allowing SIP call connection processing. However, secure communication such as TLS is not available under the UDP connection.

Even after the SIP connection using the UDP, the IPT-a1 continuously outputs a TCP connection request to the SIP server 10 at, e.g., an interval of several to several ten seconds.

When an empty TCP connection resource is assured because of, e.g., an Unregister event of another IP terminal, the SIP server 10 returns a connection OK message (SYN ACK) in response to the TCP connection request to the IPT-a1. Upon reception of this message, the IPT-a1 returns a TCP connection (ACK) message as a confirmation response to the SIP server 10. With the procedures executed so far, a TCP link is established. Then, the IPT-a1 transmits a request to switch to TCP to the SIP server 10. After that, when the SIP server 10 returns a switching OK message to the IPT-a1, a session between the IPT-a1 and SIP server 10 is switched from the SIP connection using UDP to that using TCP. After switching to TCP, the IPT-a1 closes the redundant UDP port. Then, SIP messages carried on UDP are transferred on TCP, and the SIP connection between the SIP server 10 and IPT-a1 is continued.

The message for the request to switch to TCP from the IPT-a1 can be implemented by describing that message in, e.g., an OPTION field or BODY part of a SIP message. The same applies to the switching OK message from the SIP server 10.

As described above, according to the first embodiment, even after the UDP session is formed, the IPT-a1 periodically requests the SIP server 10 to form a session using TCP. The SIP server 10 monitors an empty TCP connection resource, and when an empty resource is assured, it returns an OK message in response to the request. In response to this message, the IPT-a1 requests the SIP server 10 to switch to TCP, and the SIP server 10 and IPT-a1 continue the SIP connection by transferring SIP messages from UDP to TCP.

The SIP can function irrespective of a lower layer protocol to be used since it is a host layer application which is different from UDP and TCP. Therefore, SIP can change an IP terminal which is SIP connected using UDP to TCP without canceling the SIP registration. In this way, the switching process to TCP can be executed even during voice communication using UDP without disconnecting that communication. Also, the encrypted protocol such as TLS, which is not available because of the limited number of TCP connections, is available under the TCP connection.

Second Embodiment

FIG. 7 is a sequence chart showing the second embodiment of the lower layer protocol switching procedures. The second embodiment will explain the procedures in which a TCP or UDP session is formed according to a priority assigned to each IP terminal. In FIG. 7, assume that the extension number (DN) of an IPT-a1 is 3000, and that of an IPT-a2 is 3001. According to the management table shown in FIG. 3, the priority of the IPT-a1 is [high], and that of the IPT-a2 is [low].

Assume that a SIP connection session using TCP is formed between the IPT-a2 and SIP server 10 while no empty TCP connection resource is available in the SIP server 10. Then, assume that the IPT-a1 outputs a SIP connection request using TCP from this state. Since no TCP connection resource remains, the SIP server 10 temporarily establishes a SIP connection using UDP with the IPT-a1.

Then, the SIP server 10 refers to the management table 14a and checks the priorities of the IP terminals which formed sessions (block B1). As a result, the SIP server 10 detects that the IPT-a2 with low priority is connected using TCP, and the IPT-a1 with high priority is connected using UDP (block B2).

The SIP server 10 then instructs the IPT-a2 to switch to UDP, and switches the SIP connection of the IPT-a2 to UDP. The subsequent SIP connection session between the IPT-a2 and SIP server 10 is continued on GDP. After these procedures, since an empty TCP connection resource is assured, the SIP server 10 returns a connection OK message in response to a TCP connection request from the IPT-a1. After that, the SIP connection session between the SIP server 10 and IPT-a1 is switched from UDP to TCP via the same procedures as in FIG. 6 (block B3).

In the second embodiment, TCP connection priorities are assigned to IP terminals, and a UDP-connected terminal and TCP connected terminal are switched according to their priorities. That is, the TCP connection of a low priority IP terminal is forcibly canceled to assure an empty resource, and a SIP session between a high priority IP terminal and the SIP server 10 can be formed using TCP. According to TCP, the encrypted protocol such as TLS is available. According to the second embodiment, since the priority of an IP terminal which does not require any encryption is set to be low, and that of an IP terminal which requires encryption is set to be high, the TCP and UDP connections can be efficiently distributed, thus effectively using resources.

Third Embodiment

FIG. 8 is a sequence chart showing the third embodiment of the lower layer protocol switching procedures. This embodiment will explain the procedures in which TLS as the encrypted protocol is taken as an example, and the UDP connection/TCP connection of IP terminals is switched with reference to use/non-use of TLS. In FIG. 8, assume that an IPT-a1 is a terminal which uses TLS, and an IPT-a2 is a terminal which does not use TLS. TLS can be used by inputting, e.g., a special number or pressing an encryption key provided on the keypad unit 43 of the IP terminal.

Assume that a SIP connection session using TCP is formed between the IPT-a2 and SIP server 10 while no empty TCP connection resource is available in the SIP server 10. However, the IPT-a2 does not use TLS (unused). Then, assume that the IPT-a1 outputs a SIP connection request using TCP from this state. Since no TCP connection resource remains, the SIP server 10 temporarily establishes a SIP connection using UDP with the IPT-a1.

In this state, the IPT-a1 does not use TLS yet (unused). Then, the display controller 42c of the IPT-a1 displays a [TLS unused] message on the display 40 (LCD) to inform the user of it. As a result, the user can be prevented from communicating secure information in a non encrypted state.

The SIP server 10 then determines use or non-use of TLS for each SIP connected session (block B10). As a result, the SIP server 10 detects that the IPT-a2 which does not use TLS is connected using TCP, and the IPT-a1 which uses TLS is connected using UDP (block B20).

The SIP server 10 then instructs the IPT-a2 to switch to UDP, and switches the SIP connection of the IPT-a2 to UDP. The subsequent SIP connection session between the IPT-a2 and SIP server 10 is continued on UDP. After these procedures, since an empty TCP connection resource is assured, the SIP server 10 returns a connection OK message in response to a TCP connection request from the IPT-a1. After that, the SIP connection session between the SIP server 10 and IPT-a1 is switched from UDP to TCP via the same procedures as in FIG. 6 (block B30). With the aforementioned procedures, the IPT-a1 can establish the SIP connection by means of TCP using TLS. In this state, the display controller 42*c* of the IPT-a1 displays a [TLS use] message on the display 40 (LCD). As a result, the user can securely transmit secure information (including voice and data).

In the third embodiment, an IP terminal which uses TLS and that which does not use TLS are discriminated from each other, and when the IP terminal which uses TLS cannot establish a TCP connection, the IP terminal which does not use TLS is changed from the TCP connection to the UDP connection. In this way, a TCP connection resource is assured to allow the IP terminal which uses TLS to establish a TCP connection.

In the existing system, if there is no empty TCP session of the SIP server in the number of TCP sessions, TLS is not available, and key exchange packets for encryption used to conduct secure voice communication such as SRTP cannot be encrypted. Hence, secure SRTP communication cannot be realized, and conversation in which there is a risk of wiretapping is necessary. In contrast, according to the third embodiment, encrypted communication can be promptly and surely conducted at request even during voice communication, thus freeing the user of worry.

Note that the invention is not limited to the aforementioned embodiments. For example, in the above embodiments, the SIP is adopted as the signaling protocol. However, the invention is not limited to such a specific signaling protocol, and other protocols such as H.323 and Megaco may be used. Also, the secure communication protocol is not limited to TLS, and other encrypted protocols such as Secure RTP (SRTP) can be used.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system which comprises a plurality of terminal devices configured to process a signaling protocol, and a server which transmits and receives signals using a first transfer protocol or a second transfer protocol as a lower layer protocol to form a session of the signaling protocol, wherein each of the plurality of terminal devices comprises:
a request processor configured to transmit a request signal to form the session using the first transfer protocol, and wherein the server comprises:
a determination module configured to determine whether or not the first transfer protocol is available for transmitting signals;
a session forming module configured to form a session with a request source by setting a transfer protocol to either (i) the first transfer protocol when the determination module determines that use of the first transfer protocol is available or (ii) the second transfer protocol;
a switching module configured to switch, when a communication using the first transfer protocol becomes available turns, the lower layer protocol of the communication with the terminal device using the second transfer protocol from the second transfer protocol to the first transfer protocol while maintaining the session already formed in the signaling protocol; and
a storage device comprises a management table which assigns a session formation priority using the first transfer protocol to each terminal device;
wherein the determination module (i) confirms, by referring to the management table when the request signal from the terminal device arrives, the presence or absence of a terminal device having a lower session formation priority than the terminal device as the request source and using the first transfer protocol, (ii) instructs the switching module to change the lower layer protocol of a session already formed with the terminal device having the lower session formation priority than the terminal device as the request source from the first transfer protocol to the second transfer protocol, and (iii) grants permission to the request signal from the terminal device as the request source when a resource is assured after the lower layer protocol is changed.

2. The system of claim 1, wherein the request module continuously requests when the session is formed by the communication using the second transfer protocol, to change the transfer protocol to be used to the first transfer protocol while maintaining the session.

3. The system of claim 1, wherein the terminal device further comprises a secure communication module configured to conduct secure communication via a session formed using the first transfer protocol.

4. The system of claim 3, wherein the terminal device further comprises an informing module configured to inform a user that secure communication is allowed to be conducted.

5. The system of claim 1, wherein the first transfer protocol is Transmission Control Protocol (TCP), and the second transfer protocol is User Datagram Protocol (UDP).

6. A server which transmits and receives signals using a first transfer protocol or a second transfer protocol as a lower layer protocol to form sessions of a signaling protocol with one or more terminal devices configured to process the signaling protocol, comprising:

a determination module configured to determine, based on a request from a request source being a terminal device, whether or not the first transfer protocol is available for transmitting signals;

a session forming module configured to form the session with the request source by setting a transfer protocol to either (i) the first transfer protocol when the determination module determines that use of the first transfer protocol is available or (ii) the second transfer protocol;

a switching module configured to switch, when a communication using the first transfer protocol becomes available, the lower layer protocol of the communication with the request source using the second transfer protocol from the second transfer protocol to the first transfer protocol while maintaining the session already formed in the signaling protocol; and a storage device comprises a management table which assigns a session formation priority using the first transfer protocol to each terminal device;

wherein the determination module (i) confirming, by referring to the management table when the request from the resource source arrives, the presence or absence of a terminal device having the lower session formation priority than the request source and using the first transfer protocol, (ii) instructing the switching module to change the lower layer protocol of a session already formed with the terminal device having the lower session formation priority than the request source from the first transfer protocol to the second transfer protocol, and (iii) granting permission to the request from the request source when a resource is assured after the lower layer protocol is changed.

7. A terminal device which is configured to process a signaling protocol with a server which transmits and receives signals using a first transfer protocol or a second transfer protocol as a lower layer protocol to form a session of the signaling protocol, comprising:

a request processor configured to transmit a request signal to form the session using the first transfer protocol; and a module configured to continuously request to change the lower layer protocol to the first transfer protocol while the session with the server is formed using the second transfer protocol and the session is continued until the server confirms, after receiving the request signal from the terminal device and referring to a management table, which assigns a session formation priority using the first transfer protocol to one or more terminal devices, the presence or absence of a second terminal device having the lower session formation priority than the terminal device and using the first transfer protocol, changes the lower layer protocol of a session already formed with the second terminal device having the lower session formation priority than the terminal device from the first transfer protocol to the second transfer protocol, and grants permission to the request signal from the terminal device when a resource is assured after the lower layer protocol is changed.

8. The terminal device of claim 7, further comprising: a secure communication module configured to conduct secure communication via a session formed using the first transfer protocol.

9. The terminal device of claim 8, further comprising: an informing module configured to inform a user that secure communication is allowed to be conducted.

* * * * *